US 6,705,867 B2

(12) United States Patent
Foght et al.

(10) Patent No.: US 6,705,867 B2
(45) Date of Patent: Mar. 16, 2004

(54) THREE-DIMENSIONAL NEEDLEPOINT CANVAS

(75) Inventors: Jamieson A. Foght, Middleton, WI (US); Christopher R. Carlson, Wausau, WI (US); Carole L. Rodgers, Milo, IA (US)

(73) Assignee: Uniek, Inc., Waunakee, WI (US)

( * ) Notice: Subject to any disclaimer, the term of this patent is extended or adjusted under 35 U.S.C. 154(b) by 0 days.

(21) Appl. No.: 10/134,990

(22) Filed: Apr. 29, 2002

(65) Prior Publication Data

US 2003/0203341 A1 Oct. 30, 2003

(51) Int. Cl.[7] ............................ G09B 19/20; D05C 17/00
(52) U.S. Cl. .............................. 434/95; 434/81; 434/96; 434/83; 428/131; 428/134; 428/906.6; 112/439; 112/475.18
(58) Field of Search .............................. 112/475.18, 439; 156/63; 428/16, 39, 906.6, 131; 434/81, 95, 96, 83

(56) References Cited

U.S. PATENT DOCUMENTS

| | | | | |
|---|---|---|---|---|
| 3,240,176 A | * | 3/1966 | Morrison | 112/475.18 |
| 3,570,435 A | * | 3/1971 | Morrison | 112/475.18 |
| 4,083,740 A | * | 4/1978 | Hamanaka | 156/166 |
| 4,310,313 A | | 1/1982 | Brundige | |
| 4,555,429 A | | 11/1985 | Martin | |
| 4,568,615 A | | 2/1986 | DiVincenzo | |
| 5,024,176 A | * | 6/1991 | Musante | 112/439 |
| D361,887 S | | 9/1995 | Wenkman et al. | |
| 6,030,140 A | * | 2/2000 | Karten et al. | 402/73 |

* cited by examiner

Primary Examiner—Derris H. Banks
Assistant Examiner—Dmitry Suhol
(74) Attorney, Agent, or Firm—Foley & Lardner

(57) ABSTRACT

The present invention relates to closed three-dimensional needlepoint canvases. Each of the canvases of the present invention is made from two interconnectable perforated shells. In various embodiments, interchangeable shells of different shapes are provided which can be connected together to form three-dimensional canvases in a variety of shapes and sizes. In certain embodiments the shells have mechanically interlocking bases for easy detachment without external clips. The invention also provides craft kits containing the three-dimensional needlepoint canvases.

6 Claims, 4 Drawing Sheets

FIG. 1A
FIG. 1B
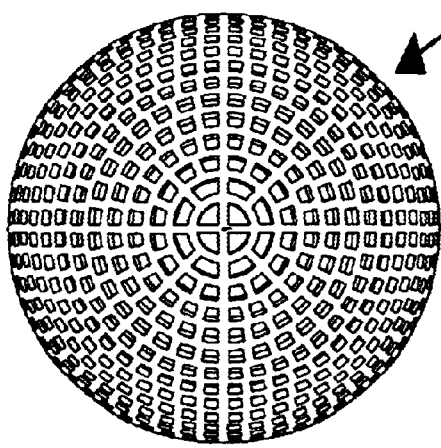
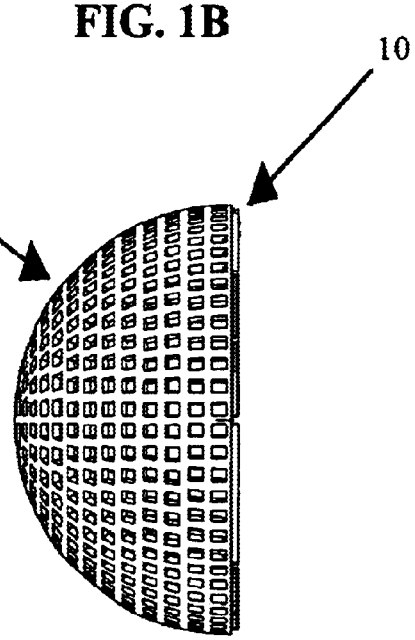

FIG. 2A
FIG. 2B
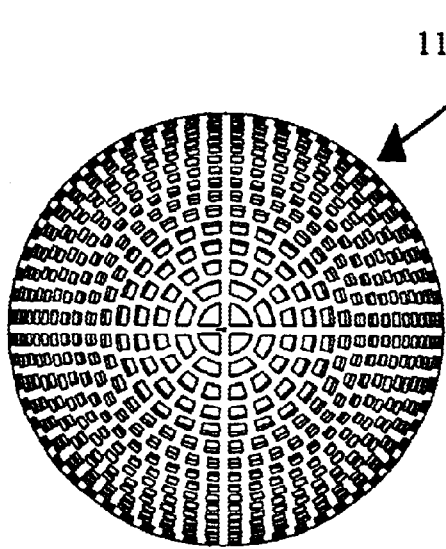
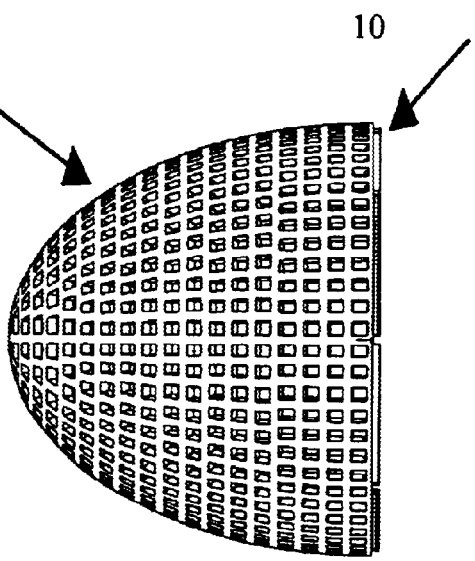

THREE-DIMENSIONAL NEEDLEPOINT CANVAS

FIELD OF THE INVENTION

The present invention relates to closed three-dimensional needlepoint canvases. Each of the canvases of the present invention is made from two interconnectable perforated shells. In various embodiments, interchangeable shells of different shapes are provided which can be connected together to form three-dimensional canvases in a variety shapes and sizes. In certain embodiments the shells have mechanically interlocking bases for easy detachment without external clips. The invention also provides craft kits containing the three-dimensional needlepoint canvases.

BACKGROUND OF THE INVENTION

Traditionally, the art of needlepoint has been practiced on flat two-dimensional canvases made of various fabrics or plastics. On these canvases, a design is either imprinted onto the canvas or shown in a separate drawing which may be transferred to the canvas by the user. As a result, the needlepoint products made from these canvases have been limited to two-dimensional representations.

In an attempt to branch out into three dimensional needlepoint products, the needlepoint industry has introduced three-dimensional needlepoint canvases made by connecting a series of individual two-dimensional canvases. Unfortunately, these three-dimensional canvases suffer from two significant drawbacks. First, they do a poor job of representing curved forms, and second, they are often impractical because they require a substantial number of two dimensional canvases to make a given three-dimensional form.

As an alternative to three-dimensional canvases made from a plurality of two-dimensional sheets, preformed three-dimensional canvases are also known in the art. However, these canvases only come in a limited range of specific shapes which are dictated by the manufacturer. Canvases of this type can be made from two canvas shells that are mirror images of each other. Such preformed canvases do not provide the consumer with the flexibility to create his or her own three-dimensional canvas shapes.

The present invention overcomes the shortcomings of the prior art by providing three-dimensional canvases made from a plurality of interchangeable canvas shells that can be connected to form an array of three-dimensional needlepoint canvases.

SUMMARY OF THE INVENTION

The present invention provides three-dimensional needlepoint canvases comprised of interchangeable perforated shells that can be connected along their bases. One aspect of the invention provides a needlepoint canvas comprising a first and a second perforated shell, each of which is a three-dimensional shell characterized by an internal surface, an external surface, and a base. The bases of the two shells are substantially the same size and shape such that the two shells can be connected along their respective bases to form a three-dimensional needlepoint canvas. In one embodiment the base of the first shell and the base of the second shell are able to mechanically interlock to connect the two shells, forming a closed three-dimensional needlepoint canvas. Typically, the three dimensional canvas will be a continuous closed canvas. In various embodiments of the invention, the first shell and the second shell have different shapes.

Another aspect of the invention provides a needlepoint kit comprising a three-dimensional needlepoint canvas of the type described above, as well as a stitching material and, optionally, a threading tool. The stitching material may be any material capable of being strung through the perforations in the canvas. Examples of suitable stitching materials include, but are not limited to, string, thread, yarn, and the like. In one embodiment, the kit contains a plurality of shells having a plurality of shapes wherein the base of each shell is substantially the same size and shape such that any two shells in the kit can be connected at their bases to form a three-dimensional needlepoint canvas.

BRIEF DESCRIPTION OF THE DRAWINGS

FIG. 1A shows a top view and FIG. 1B shows a side view of a hemispherical needlepoint shell according to the present invention.

FIG. 2A shows a top view and FIG. 2B shows a side view of a half ellipse needlepoint shell according to the present invention.

DETAILED DESCRIPTION OF THE PREFERRED EMBODIMENT

The present invention provides a variety of three-dimensional needlepoint canvases, each of which is constructed from two interconnected perforated shells which are connected along their bases. The shells may have a variety of shapes, but the base of each shell is substantially the same size and shape such that the shells may be interchanged to form three-dimensional canvases having different shapes. One of the skill in the art will recognize that the bases of the shells can take on a variety of shapes without affecting the nature of the invention. In one embodiment, the bases of the shells are circular and the shells come together to form a continuous closed canvas. Examples of two shells according to the present invention are shown in FIGS. 1 and 2. The invention also provides for kits containing at least two of the shells described above, as well as a stitching material and at least one threading tool capable of drawing the stitching material through the perforations in the canvas shells. In certain embodiments, the kits contain at least two differently shaped connectable shells and preferably a plurality of differently shaped interchangeable shells.

Figure 3A:
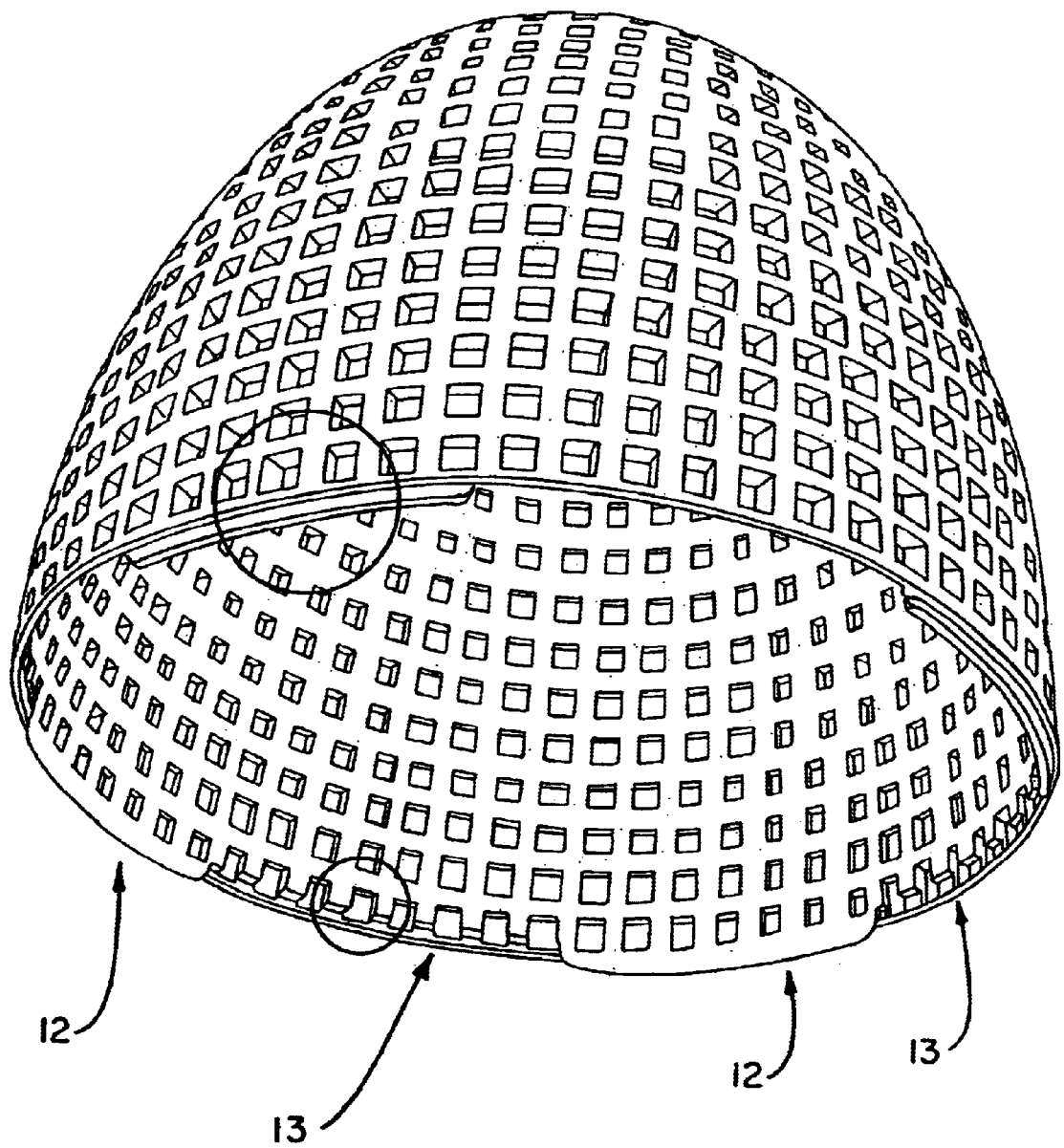
FIGS. 3A, 3B, and 3C show close-up views of an interlocking mechanism for a needlepoint shell according to the present invention.
Figure 3B:
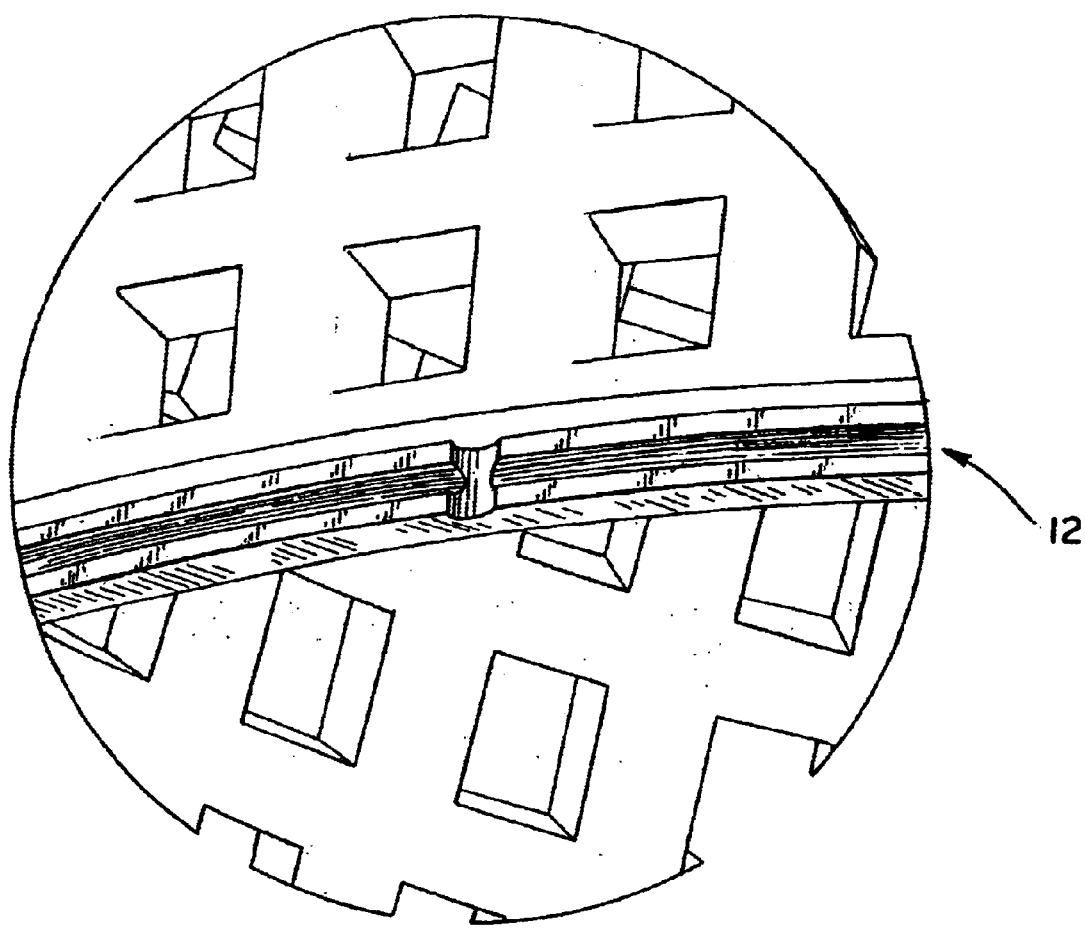
Figure 3C:
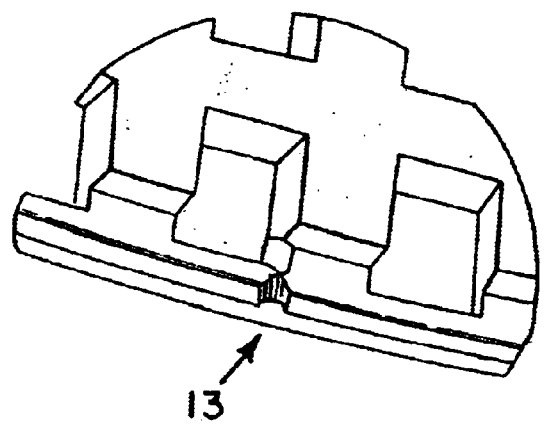

The two shells may be connected to form a three-dimensional canvas by any suitable means of attachment. In various embodiments adhesives or connectors, such as clasps, snaps, or hooks, are used to attach the bases of the shells to one another. Alternatively, the two shells may be sewn together along their base using thread or another stitching material. In one embodiment the base 10 of the first shell 11 and the base of the second shell mechanically interlock to connect the two shells forming a closed three-dimensional needlepoint canvas. This design makes it easy to detach the shells without the need to sever or undue any stitching, facilitating the interchanging of shells from different three dimensional canvases. This feature has the advantage of allowing the user to mix and match shells having a variety of patterns to produce three dimensional canvases with different designs. This design also has the substantial advantage of providing a three dimensional needlepoint canvas that does not require additional external clips which are difficult to disguise if placed on the external surface of the canvas and which are difficult to access if placed on the internal surface of the canvas. The locking mechanism on the shells according to the invention may be designed such that the bases of the shells are flush with each other when they are interlocked. This creates a smooth seam which is substantially invisible when the two shells are covered with a stitching material. One example of a mechanical interlocking system on the base of a needlepoint shell is shown in FIG. 3. In this system, each shell has a series of alternating tabs 12 and slots 13 along its base and the tabs from one shell are able to snap into the slots of another shell, interlocking the two shells.

In embodiments where the first and second perforated shells are of different shapes, the plane of attachment of the shells does not represent a plane of symmetry. This feature allows a higher degree of canvas asymmetry, and therefore, design flexibility and creativity than other three-dimensional canvases currently available.

The perforated shells may be made of any material that can be formed into a three-dimensional shell which is able to hold its form and is able to be perforated. Examples of such materials include stiffened fabrics and plastics. The shells may be made by techniques well known in the art. For example, plastic shells may be molded through conventional molding techniques such as, but not limited to, injection and blow molding. The perforations which extend through the shell may be added to the shell during shell processing. Alternatively, a non-perforated shell may be molded and the perforations may be added later. The perforations should be big enough to draw a stitching material through. In certain embodiments, the shells will be substantially uniformly covered with perforations, while in other embodiments, only a portion of the shells will be perforated. In other embodiments, the perforations will be spaced in the shells to create a predetermined pattern to guide the user in making a design. Alternatively, a pattern may be printed onto the perforated canvas itself to aid the user.

One skilled in the art would recognize that the individual shells may take on a great variety of shapes and that the particular shape of the shells is not critical to the invention. Examples of suitable shapes for the shells include those having generally rounded curves, such as hemispheres and half ellipses, as shown in FIGS. 1 and 2. Cone shapes are also suitable. In various embodiments the shells may even take on a freeform shape, characterized by flowing asymmetrical shapes. In other embodiments the shells will be mirror images in the form of half of a common three dimensional shape, such as a heart, a star, or a teddy bear, such that the two shells together form a three dimensional object.

The shape of the three-dimensional canvases will depend upon the shapes of the three-dimensional shells used to make them, therefore the possible canvas shapes are as numerous and varied as the possible shell shapes. Examples of some simple canvas shapes, include shapes having one plane of symmetry, such as spheres (i.e. two connected hemispherical shells) and ellipses (i.e. two connected half ellipses), as well as shapes having two planes of symmetry such as egg shapes (i.e. a hemisphere attached to a half ellipse) or ice cream cone shapes (i.e. a hemisphere attached to a cone).

Needlepoint works are made from the present invention by stringing a stitching material through the perforations in the shells to produce a pattern. In order to ensure easy access to both the external and internal surfaces of the perforated canvases, the user will generally decorate each shell with a stitching material before attaching the decorated shells.

Uses for the three-dimensional needlepoint works of the present invention are both decorative and practical. For example, needlepoint works made from the canvases can be used as decorations, such as ornaments. Alternatively, needlepoint works made from shells which can be readily attached or detached (e.g. shells which are snapped together) can be used as containers.

One big advantage offered by the three-dimensional canvases of the present invention is the flexibility it provides the consumer. The shells of the present invention can be sold separately such that a consumer can pick and choose different shells to make differently shaped three-dimensional objects, according to his or her own tastes. Alternatively, a kit can be provided that contains a plurality of shells such that a consumer who buys the kit can fashion multiple three-dimensional canvases from a single kit.

While preferred embodiments have been illustrated and described, it should be understood that changes and modifications can be made therein in accordance with ordinary skill in the art without departing in its broader aspects as defined in the following claims.

What is claimed is:

1. A needlepoint canvas comprising a first perforated shell characterized by an internal surface, an external surface, and a base and a second perforated shell characterized by an internal surface, an external surface, and a base, wherein the base of each shell is substantially the same size and shape such that the base of the first shell and the base of the second shell can be attached to form a three-dimensional needlepoint canvas and further wherein the first shell and the second shell have different shapes such that the plane of attachment does not represent a plane of symmetry.

2. The needlepoint canvas of claim 1 wherein the three-dimensional needlepoint canvas is a closed canvas.

3. The needlepoint canvas of claim 1 wherein the shape of the first and the second shells are selected from the group consisting of hemispheres, half ellipses, and cones.

4. A needlepoint kit comprising:
   (a) a first perforated shell characterized by an internal surface, an external surface, and a base and a second perforated shell characterized by an internal surface, an external surface, and a base, wherein the base of each shell is substantially the same size and shape such that the base of the first shell and the base of the second shell can be attached to form a three-dimensional needlepoint canvas and further wherein the first shell and the second shell have different shapes such that the plane of attachment does not represent a plane of symmetry;
   (b) a stitching material; and
   (c) at least one threading tool capable of drawing the stitching material through the perforations in the first and second shells of the canvas.

5. The needlepoint canvas of claim 4 wherein the three-dimensional needlepoint canvas is a closed canvas.

6. The kit of claim 4 wherein the shape of the first and the second shells are selected from the group consisting of hemispheres, half ellipses, and cones.

* * * * *